No. 727,008. PATENTED MAY 5, 1903.
E. A. SJÖSTEDT & W. M. GOODWIN.
RABBLE ARM AND CONNECTING DEVICE FOR CENTRAL SHAFTS
IN ORE ROASTERS.
APPLICATION FILED MAR. 8, 1902.
NO MODEL.

Witnesses
M. Piotrzkowsky
E. Howell

Ernst A. Sjöstedt
William M. Goodwin
Inventors by A. B. Harvey
their Attorneys

No. 727,008. Patented May 5, 1903.

UNITED STATES PATENT OFFICE.

ERNST A. SJÖSTEDT AND WILLIAM MARINER GOODWIN, OF SAULT STE. MARIE, CANADA, ASSIGNORS TO THE LAKE SUPERIOR POWER COMPANY, OF SAULT STE. MARIE, CANADA.

RABBLE-ARM AND CONNECTING DEVICE FOR CENTRAL SHAFTS IN ORE-ROASTERS.

SPECIFICATION forming part of Letters Patent No. 727,008, dated May 5, 1903.

Application filed March 8, 1902. Serial No. 97,358. (No model.)

*To all whom it may concern:*

Be it known that we, ERNST ADOLF SJÖSTEDT and WILLIAM MARINER GOODWIN, of Sault Ste. Marie, in the district of Algoma, in the Province of Ontario, Canada, have invented certain new and useful Improvements in Rabble-Arms and Connecting Devices to Central Shafts in Ore-Roasters; and we do hereby declare that the following is a full, clear, and exact description of the same, reference being had to the accompanying drawings, forming a part hereof.

Our invention, which will be hereinafter fully set forth and claimed, relates to the construction of rabble arms or stirrers and the mode of securing them removably to the central hollow shaft of ore-roasting furnaces.

The object of our invention is a rabble-arm of more approved cross-section and especially of a more secure mode of securing the same to the central hollow shaft.

Figure 2:
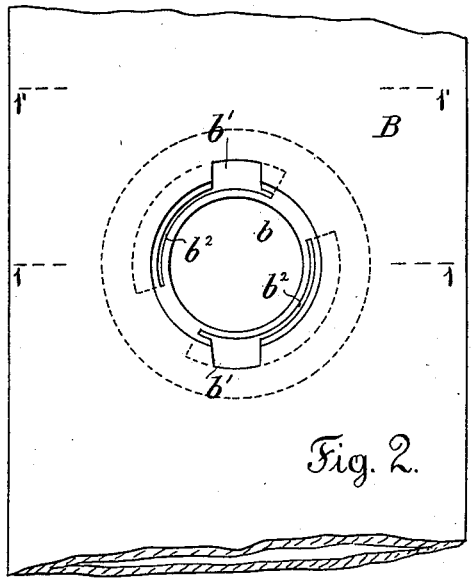
Figure 3:
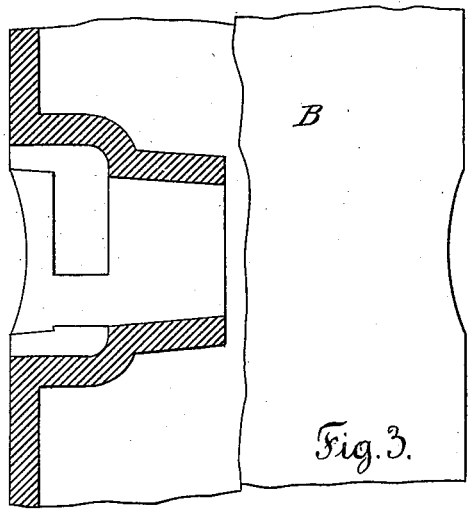
Figure 1:
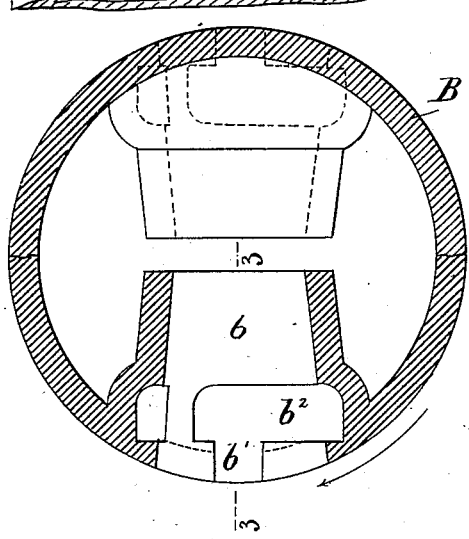
Figure 4:
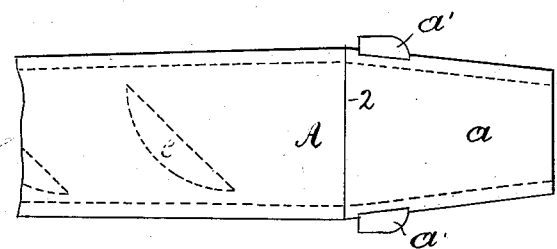
Figure 5:
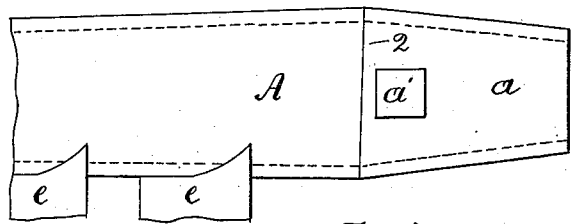
Figure 6:
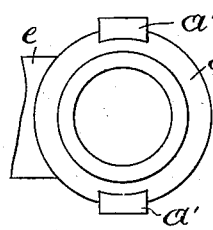

Figure 1 is a horizontal section of the central shaft on the lines 1 1 and 1' 1', Fig. 2. Fig. 2 is an elevation of part of the central shaft, showing the socket or mortise for the rabble-arm. Fig. 3 is a vertical transverse section on line 3 3, Fig. 1, showing the socket or mortise on one side and the other half being in elevation. Fig. 4 is a top view of the rear end of the rabble-arm. Fig. 5 is an elevation of the same, and Fig. 6 is an end view of the same.

The rabble-arm A is of circular tubular cross-section, tapering from the rear end to the free end and having on its lower surface the teeth $e$. The rear end $a$, intended to enter the central hollow shaft, is tapered rearwardly to form a taper plug or tenon. This tenon is provided with lugs $a'$ on opposite sides and near the line 2.

B is the hollow central shaft. At the point where the arms are to be inserted sockets or mortises $b$ are formed, which are adapted to receive and fit the tenons $a$. In the rim or mouth of said sockets or mortises are formed grooves $b'$, registering with the lugs $a'$ on the tenons of the arm when the arms are turned approximately a quarter of a turn. These grooves $b'$ are short and are continued inside the socket at a right angle for about a quarter of a turn, forming an annular recess $b^2$ within the socket.

If a rabble-arm is to be inserted, the end of the tenon $a$ is inserted into the mouth of the socket $b$ and turned out of its way until the lugs $a'$ register with the grooves $b'$. The arm is then pushed home and twisted into its position, whereby the lugs $a'$ travel in the annular grooves $b^2$, rest there, and are thus locked into position, it being impossible to withdraw the arm without turning it back, so that the lugs stand opposite the grooves $b'$.

If an arm is to be replaced, all that is necessary is to twist the arm until the lugs $a'$ register with the grooves $b'$, when the arm may be freely withdrawn.

The arrow, Fig. 1, shows the direction in which the central shaft B rotates. The recesses $b^2$ are made in a direction from the grooves $b'$ opposite to that of the direction of rotation of the hollow shaft, so that the arm when being inserted has to be turned in the same direction in which it would be turned by the resistance of the teeth $e$ in the ore on the hearth. The resistance of the lugs $a'$ against the shoulders of the recesses $b^2$ keeps the arm in the desired position when once inserted.

It will be observed that on account of the arm being only required to be turned on its own axis when being inserted or removed a very small opening in the casing of the furnace is required for that purpose, also that the arm is firmly seated and no lifting action which might be caused in the ore in which the teeth $e$ are working will dislocate it.

We claim as our invention—

1. The combination in a roasting-furnace of a hollow vertical shaft having a mortise or socket circular in cross-section and tapering lengthwise and having short longitudinal grooves in its rim or mouth said grooves being continued within the socket at a right angle and stopped to form recesses, of a rabble-arm having a conical plug fitting the said socket in the vertical shaft and said plug having lugs registering with the said grooves and fitting the said recesses, substantially as set forth.

2. The combination of a hollow rabble-arm with teeth and having a circular tapering plug end with shouldered lugs near the thick end, a hollow shaft having transverse open sockets circular in cross-section and tapering lengthwise to fit the plug ends of the arms, said sockets each provided with grooves at the mouth and said grooves inside said sockets turned at a right angle and continued for a quarter of a turn and stopped, substantially as set forth.

In testimony whereof we have signed in the presence of the undersigned witnesses.

ERNST A. SJÖSTEDT.
WILLIAM MARINER GOODWIN.

Witnesses:
FRANK E. LEACH,
W. A. BARTHOLOMEW.